United States Patent [19]

Baldyga

[11] 4,000,100
[45] Dec. 28, 1976

[54] THERMAL AND LIGHT STABILIZED POLYVINYL CHLORIDE RESINS

[75] Inventor: Henry Baldyga, Catonsville, Md.

[73] Assignee: W. R. Grace & Co., New York, N.Y.

[22] Filed: June 4, 1971

[21] Appl. No.: 150,225

[52] U.S. Cl. .................. 260/23 XA; 260/33.8 UA; 260/42.37; 260/42.54; 252/400 A

[51] Int. Cl.² .......................................... C08L 91/00

[58] Field of Search ............... 260/23 XA, 41.5, 41, 260/DIG. 33, 42.37, 42.54; 252/455 Z

[56] References Cited

UNITED STATES PATENTS

| | | | |
|---|---|---|---|
| 3,245,946 | 4/1966 | O'Connor | 260/41 A |
| 3,313,825 | 4/1967 | Rosenburg | 260/23 XA |
| 3,454,514 | 7/1969 | Baum | 260/23 XA |
| 3,518,226 | 6/1970 | Wood | 260/23 XA |
| 3,533,975 | 10/1970 | Scullin | 260/23 XA |
| 3,539,636 | 11/1970 | Dorfelt et al. | 260/23 XA |

Primary Examiner—Melvyn I. Marquis
Assistant Examiner—William E. Parker
Attorney, Agent, or Firm—Michael J. McGreal

[57] ABSTRACT

This invention comprises the polyvinyl chloride stabilizer composition of an unactivated Zeolite A molecular sieve or an unactivated naturally occurring molecular sieve of essentially the same pore size range as Zeolite A and a conventional inorganic, organometallic or organic stabilizer, or mixture of these stabilizers. An unactivated zeolite molecular sieve has adsorbed water molecules. The combination of the unactivated zeolite molecular sieve and the conventional stabilizer produces a resin of greater stability than that produced by either of the components when used separately.

33 Claims, No Drawings

THERMAL AND LIGHT STABILIZED POLYVINYL CHLORIDE RESINS

BACKGROUND OF THE INVENTION

This invention relates to the stabilization of polyvinyl chloride resins. More particularly, this invention pertains to the stabilization of polyvinyl chloride resins from the degradative effects of ultraviolet light and heat, as well as improving plate-out resistance.

It is well known that polyvinyl chloride containing resins degrate at elevated temperatures. When vinyl chloride polymers and copolymers are subjected to molding temperatures in excess of about 150° C, they tend to discolor. Serious discoloration occurs even in the relatively short period of time required for a molding operation. This serious coloration of the resin causes a high molded article rejection rate when clear articles are being produced, and further obviates the reuse of scrap material from the molding processes.

In regard to ultraviolet degradation, this takes place subsequent to molding and while the article is in use. Molded polyvinyl chloride panels which are used in exterior construction are particularly susceptible, as well as molded articles such as playground and other recreational equipment, automobile parts and so on, which are exposed to sunlight for long periods of time. Such articles on ultraviolet degradation become embrittled and readily crack or shatter. When this embrittling occurs, the article is no longer effective in its original function.

By plate-out resistance is meant the resistance to forming residual deposits on machine parts such as extruder dies or calender or mill rolls as the resin is being processed. Such deposits left on the rollers will cause imperfections in resin subsequently passed through such rolls. This is a problem particularly in forming films. Unexpectedly, the unactivated Zeolite A and related unactivated naturally occurring molecular sieves increase the plate-out resistance properties of the resin.

This invention is specifically directed to the solving of these related problems. To date, numerous stabilizers have been suggested for use in polyvinyl chloride type resins. The most satisfactory of these stabilizers comprise barium, tin, lead and cadmium containing organometallic compounds. These compounds, while performing satisfactorily, still have not solved the problem of heat and ultraviolet light degradation of polyvinyl chloride resins. In heat stabilization, there is a need for further increasing both the temperature which the resin can withstand as well as the time duration at elevated temperatures. The present invention has to a degree solved this problem by extending both of these barriers. Further, the stabilizer system of the present invention has also proven to increase manyfold the ultraviolet stability of the resin. The increased light stability has now made polyvinyl chloride resins useful for many long term exterior uses.

In essence, the present invention comprises the synergistic stabilizing effect of unactivated Zeolite A type molecular sieves. When used in admixture with these or related conventional polyvinyl chloride stabilizers, there is a synergistic stabilizing effect. This effect is exhibited in higher and longer duration heat stabilities, as well as improved long term ultraviolet light stability.

The prior art is replete with inorganic, organometallic, and organic polyvinyl chloride stabilizer materials. The prior art has also disclosed the use of activated Zeolite A alone as a stabilizer for polyvinyl chloride resins. Such a use for activated Zeolite A is disclosed in U.S. Pat. No. 3,245,946. However, the use of an unactivated Zeolite A, and further, the use of an unactivated Zeolite A in conjunction with an inorganic, organometallic or organic stabilizer has not been disclosed or suggested by the prior art, which has instead directed that Zeolite A molecular sieves not be used. This is for the reason that they contain absorbed water which, by theory, on contact with any chlorine from the polyvinyl chloride resin degradation, would combine to form hydrogen chloride. Hydrogen chloride is known to catalytically aid polyvinyl chloride degradation. However, this water bound in the sieve by adsorbtion is not deleterious, but by some unknown mechanism unexpectedly aids in the transport and trapping of the hydrogen chloride within the sieve. And when this sieve is used in conjunction with the convention organometallic or organic stabilizers, there is a distinct increase in thermal and light stability.

It is, therefore, a particular object of this invention to set out synergistic polyvinyl chloride stabilizing systems comprised of unactivated Zeolite 3A, unactivated Zeolite 5A, or unactivated Zeolite 4A and conventional inorganic, organic or organometallic stabilizers or mixtures of these stabilizers.

It is further an object of this invention to provide polyvinyl chloride resins which can withstand higher molding temperatures for longer periods of time.

It is also an object of this invention to provide polyvinyl chloride resins which are highly resistant to long term ultraviolet light initiated degradation.

It is additionally an object of this invention to set out polyvinyl chloride resins of increased plate-out resistance.

BRIEF SUMMARY OF THE INVENTION

It has unexpectedly been found that the addition of an unactivated Zeolite 3A molecular sieve, an unactivated Zeolite 4A molecular sieve, an unactivated Zeolite 5A molecular sieve, or unactivated naturally occurring molecular sieves having esssentially the same pore sizes as the Zeolite A molecular sieves in combination with a conventional inorganic, organometallic or organic stabilizer or mixture of these stabilizers increases the thermal and ultraviolet light stability of a polyvinyl chloride resin, and further increases the plate-out resistance. The degree of stability is greater than that exhibited by the conventional stabilizers or the unactivated molecular sieves used alone. The concentrations are in the range of from 0.5 to 5 parts of the zeolite molecular sieves and 1 to 5 parts of the conventional stabilizer to 100 parts of polyvinyl chloride resin.

DETAILED DESCRIPTION OF THE INVENTION

Broadly, this invention comprises a synergistic polyvinyl chloride resin stabilizing composition. This composition consists essentially of an unactivated Zeolite 3A, an unactivated Zeolite 4 A, an unactivated Zeolite 5A or an unactivated naturally occuring molecular sieve having essentially the same pore sizes as the Zeolite A molecular sieves, or mixtures thereof, and a conventional inorganic, organometallic or organic polyvinyl chloride resin stabilizer or a mixture of these stabilizers. The concentrations of the stabilizer components are in the range of from 0.1 to 5 parts of molecular sieve and 0.1 to 5 parts conventional stabilizer per hundred parts resin (PHR). The compositions of this invention synergistically increase the thermal and ultraviolet light stability of polyvinyl chloride resins and resin products, as well as improving plate-out resistance while these products are being fabricated.

As used in this application, the terms unactivated Zeolite 3A molecular sieve, unactivated 4A molecular sieve, and unactivated 5A molecular sieve refer to crystalline aluminosilicates of a well-defined structure. The material designated Zeolite 4A is that set out in U.S. Pat. No. 2,882,243. This material has a formula of $Na_{12}(AlO_2)(SiO_2)_{12}$, which has a multiple 6 of the empirical mineralogical oxide formula of $Na_2O.Al_2O_3.2SiO_2$. This material may also have 4 to 5 waters of hydration. This Zeolite 4A is crystalline and exhibits X-ray values as set out in Table 1.

Table I

| d Value of reflection | | |
| --- | --- | --- |
| 12.2 | ± | 0.2 |
| 8.6 | ± | 0.2 |
| 7.05 | ± | 0.15 |
| 4.07 | ± | 0.08 |
| 3.68 | ± | 0.07 |
| 3.38 | ± | 0.06 |
| 3.26 | ± | 0.05 |
| 2.96 | ± | 0.05 |
| 2.73 | ± | 0.05 |
| 2.60 | ± | 0.05 |

This Zeolite A, designated 4A, is essentially the sodium zeolite A which has an average effective pore diameter of 4 angstroms, thus the name Zeolite 4A. Zeolite 3A is the potassium exchanged form of Zeolite 4A, that is, a Zeolite 4A in which the sodium ions are exchanged with potassium ions yielding a Zeolite A sieve having pores of an average effective diameter of 3 angstroms. Zeolite 5A is the calcium exchanged form of Zeolite 4A, that is, a Zeolite 4A in which the sodium ions are exchanged with calcium ions yielding a Zeolite A sieve having pores of an average effective diameter of 5A. The naturally occurring zeolites which have about the same pore sizes as the Zeolite A sieves and which are useful include chabazite, erionite, clinoptilolite, stilbite and heulandite. The designation unactivated indicates that sieve has not been heated or calcined to drive off adsorbtively bound water. The sieve is in a dry condition, but contains from about 18 to 25 percent by weight water, while an activated sieve contains less than 10 percent by weight water. A small zeolite particle size in the range of 0.01 to 10 microns is most useful in this application.

The conventional polyvinyl chloride resin stabilizers which are enhanced when used in combination with these unactivated zeolite molecular sieves comprise inorganic, organometallic and organic stabilizers. Illustrative of these stabilizers are: sodium carbonate, basic lead carbonate tribasic lead sulfate monohydrate, tetrabasic lead sulfate, sodium silicate, basic lead silicate sulfate, lead orthosilicate, calcium silicate, trisodium phosphate, tetrasodium pyrophosphate, sodium hexametaphosphate, lead phosphite, lead stearate, dibasic lead stearate, cadmium stearate, barium stearate, calcium stearate, strontium stearate, magnesium stearate, zinc stearate, tin stearate, lithium stearate, cadmium laurate, barium laurate, cadmium ricinoleate, barium ricinoleate, calcium ricinoleate, strontium ricinoleate, tin ricinoleate, zinc ricinoleate, calcium caprate, lead undecylate, sodium acetate, lead 2-ethyl hexoate, cadmium 2-ethylhexoate, barium 2-ethyl hexoate, strontium 2-ethyl hexoate, zinc 2-ethelhexoate, lead triethylhexylmaleate, tribasic lead maleate monohydrate, cadmium cyclohexylmaleate, dibasic lead phthalate, strontium napthenate, cadmium naphthenate, magnesium salicylate, strontium salicylate, calcium salicylate, tin salicylate, calcium ethylacetoacetate, ethylenediaminetraacetic acid complexes of lead, calcium, tin or zinc, organotin compounds having the formulae $(R_3)=Sn-A$, $(R_2)=Sn=(A)_2$, and $R-n=(A)_3$, wherein R is alkyl, aryl or arylaklyl and A is a radical other than a hydrocarbon such as oxygen, sulfur, derivative of carbonylic acid, mercaptan, phenol, alcohol or sulphanamide, also included as alkaline earth alcoholates and phenolate, glycidyl ethers, bisphenol A polymers, glycidyl alcohol esters, unsaturated epoxy esters, organic phosphites such as the alkaryl phosphites, trialkyl phosphites, triaryl phosphites and metal salts of these phosphites, amines such as monophenylurea, diphenyl thiourea, polyhydric alcohols (polyols) such as pentaerythritol, glycerol or ethylene glycol, and orthoesters such as those set out in U.S. Pat. Nos. 3,518,226, 3,518,224, 3,514,428, 3,515,693 and 3,515,694.

This listing of conventional stabilizers is not meant to be inclusive of all stabilizers useful in combination with unactivated Zeolite molecular sieves, but is rather meant to be illustrative of the scope of conventional stabilizers. Further, the useful commercial stabilizers are usually mixtures of two or more of these conventional stabilizers. As mixtures, these either additively or synergistically aid in the stabilization of the polyvinyl chloride resin. Exemplary of organic phosphite mixture stabilizers are Mark C, Mark DMY (Argus Chemical Corporation), Ferro 903 (Ferro Corporation), Vanstay S (R. T. Vanderbilt Co. ), Advastab CH 55 and Advastab CH 90 (Cincinnati Milacron Chemicals Inc.). Exemplary of organotin type stabilizers are Thermolite 12, Thermolite 13 (M & T Chemicals Inc.) and Mellite 135 (Albright and Wilson Ltd.). Barium-cadmium organic stabilzer mixtures include Advastab PC 12, Ferro 1825 and Mark 235 which are powders, and Advastab C72, Ferro 5636 and Mark 462, which are liquids. Exemplary of organotin stabilizer mixtures are Advastab T 17 M, Mark A and Mark 649 A. Mark KCB is exemplary of a liquid organic barrium-cadmium-zinc stabilizer. There are yet numerous other polyvinyl chloride stabilizer systems. Also from the above known individual stabilizers many fabricators have developed their own stabilizing mixtures. However, in any instance, when the unactivated zeolite molecular sieve is added to the resin in conjunction with any of these stabilizers or mixtures of these stabilizers, the heat and ultraviolet light stability is enhanced, and the plate-out resistance increased.

The polyvinyl chloride resins may also contain other additives such as plasticizers, lubricants, initiators, activators, regulators or suspending agents. Classes of useful plasticizers are the phthalate ester plasticizers, phosphate plasticizers, polymeric plasticizers such as polypropylene sebacate and polypropylene adipate, aklyl esters of adipic, selacic, azelaic or fatty acids, glycol esters or epoxidized oils and esters. Useful initiators are organic peroxides, azo compounds and redox systems. Useful suspending agents which function to prevent agglomeration of polymer particles during polymerization include gelatins, methyl celluloses, vinyl polymers, maleic polymers, condensation resins, polyethylene glycols, polyglycerols as well as many others.

In essence there is no limitation in the present invention in regard to the polyvinyl chloride resin or the additives which it may contain. Enhancement of stabilization will occur when the unactivated zeolite molecular sieve is a part of the system.

The method of incorporating the unactivated zeolite molecular sieve into the resin is by any of the conventional techniques of introducing a solid into a thermoplastic resin. These include the dry blending of powders in a mixer, heating to a viscous liquid condition and mixing one into the other as in a Banbury Mixer, or heating a set of rolls in a two-roll mill and passing the resin and zeolite mixture between the rolls. The preferred methods are by use of a Banbury Mixer or a two-roll mill. When incorporating this dual stabilizing system into the polymer, the components may be added to the resin in either order, or together. Further, the stabilizer may be added prior to or after the addition of the plasticizer, suspending agent or other such additives. The stabilizer system should, however, be added prior to the addition of any curing agents when the polyvinyl chloride is in admixture with another resin.

The improvement in heat stability is substantial. By using a combination of the stabilizers, there is a greater stability than when either is used alone, or even that which could be expected from an additive mixture. This improvement of heat stability has decreased discoloring of the resin or film, allowed the use of higher molding temperatures and longer periods of time at these temperatures, and very importantly has permitted greater reuse of scrap material. These are advantages which are of a prime interest to the fabricator. Also advantageously for the fabricator, and fully unexpected, is the increased plate-out resistance of the resin during fabrication. The benefits from increased plate-out resistance are obvious to those in the art. If a film is being processed and there is plating out on the rolls, there will be serious imperfections in the film. If the plate-out is on a mold surface, the article will have a differing shape from that which a clean mold would produce. Plate-out can cause excessive wastage since the articles must be discarded or reprocessed.

In regard to ultraviolet light stability, an increase in these properties not only improves polyvinyl chloride articles in present uses, but also opens up new product areas. This is particularly so in the construction field where lifetimes of 10 to 30 years are expected and necessary. By increasing the ultraviolet light stability, polyvinyl chloride resins may be used for guttering, siding, window framing and so on. Such parts are constantly exposed to sunlight and must essentially inert to the effects of the levels of ultraviolet light emitted by the sun.

EXAMPLE I

This example illustrates the oven heat stability of rigid opaque polyvinyl chloride resins containing various concentrations of organic stabilizer and unactivated Zenolite 3A. The results are given as percent reflectance.

The polyvinyl chloride resin mixture has the following formulation in parts by weight:

| | |
|---|---|
| *Geon 103 EP | 100.0 parts |
| *Advawax 280 | 0.1 part |
| Advastab T 17 M | (as shown in Table I) |
| Titania (< 1 $\mu$) | 5.0 parts |
| Unactivated Zeolite 3A | (as shown in Table I) |

*Geon 103 EP is a trademark of the B. F. Goodrich Co. for polyvinyl chloride resin.
Advawax 280 is a trademark of Cincinnati Milacron Chemicals Inc. for a resin lubricant.

The resin is compounded into test sheets having dimensions of about 6 × 8 × 0.3 inches. These test sheets are then cut into approximately 2 × 2 × 0.3 test specimens. The comparative results for these specimens are set out in Table I after having been in an oven at 150° C. for 24 hours. The material prior to oven heating has about 93 percent reflectance.

Table I

| Advastab T 17 M | Zeolite 3A | % Reflectance |
|---|---|---|
| 0 parts | 5 parts | 43 |
| 3 parts | 0 parts | 58.6 |
| 1 part | 0 parts | 50.9 |
| 1 part | 4 PHR parts | 68.1 |
| 2 parts | 3 PHR parts | 75.5 |
| 3 parts | 2 PHR parts | 76.6 |

The best systems (highest percent reflectance) are mixtures of Advastab T 17 M and Zeolite 3A. The mixtures exhibit improved reflectance greater than either used alone. (Reflectance is measured by a Martin-Sweets Co. Standard Color Brightness Tester Model S-1.

EXAMPLE II

This example illustrates the oven heat stability of rigid opaque polyvinyl chloride resins containing various concentrations of organic stabilizer and unactivated Zeolite 4A. The results are given as percent reflectance in Table II.

The polyvinyl chloride resin mixture has the following formulation in parts by weight.

| | |
|---|---|
| Geon 103 EP | 100 parts |
| Advawax 280 | 0.5 parts |
| Titania | 5 parts |
| Mark 649 A or Mark A | (as shown in Table II) |
| Unactivated Zeolite 4A | (as shown in Table II) |

The resin is compounded into test sheets having dimensions of about 6 = 8 = 0.3. inches. These test sheets are then cut into approximately 2 × 2 × 0.3 test specimens. The comparative results for these specimens are set out in Table II after having been in an oven 150° C for 24 hours. The material prior to heating has about 93 percent reflectance. Oven stability is set out in Table III where specimens of the same formulations as in Table II were tested for reflectance at set time intervals. The temperature of the oven in these oven stability tests was 177° C.

Table II

| Formulation | Organic Stabilizer | Unactivated Zeolite | % Reflectance |
|---|---|---|---|
| A | 1 part MARK 649A | 4 parts Zeolite 4A | 75.7 |
| B | 1 part MARK 649A | 3 parts Zeolite 4A | 74.1 |
| C | 2 parts MARK 649A | 1 part Zeolite 4A | 77.5 |

Table II-continued

| Formulation | Organic Stabilizer | Unactivated Zeolite | % Reflectance |
|---|---|---|---|
| D | 2 parts MARK 649A | 2 parts Zeolite 4A | 80.3 |
| E | 3 parts MARK 649A | | 64.5 |
| F | 1 part MARK A | 4 parts Zeolite 4A | 73.7 |
| G | 1 part MARK A | 3 parts Zeolite 4A | 69.8 |
| H | 2 parts MARK A | 2 parts Zeolite 4A | 73.6 |
| I | 2 parts MARK A | 1 part Zeolite 4A | 55.1 |
| J | 3 parts MARK A | | 54.7 |

Table III

| Minutes at 177° C | FORMULATION | | | |
|---|---|---|---|---|
| | A | B | D | E |
| | % reflectance | | | |
| 0 | 93 | 92 | 92 | 93 |
| 30 | 91 | 91 | 91 | 92 |
| 90 | 89 | 87 | 89 | 90 |
| 120 | 84 | 85 | 88 | 80 |
| 240 | 70 | 71 | 80 | 67 |

EXAMPLE III

This example illustrates the increased plate-out resistance of the polyvinyl chloride resins which also contain unactivated Zeolite 3A or Zeolite 4A sieves.

Plate-out resistance is determined by use of a white control resin and a red colored resin. The red resin is passed through a set of rolls with some of this red resin plating out on these rolls depending on the plate-out resistance. The white control resin is then passed through the same rolls. The amount of redness picked up by the white resin determines the plate-out resistance of the red resin. The formulation of the red and white resins are as follows:

| White Control | | Red Stock | |
|---|---|---|---|
| Geon 103 EP - | 100.0 parts | Geon 103 EP - | 100.0 parts |
| Mineral Oil - | 0.5 parts | Advance ESO - | 3.0 parts |
| Titania - | 5.0 parts | Mineral Oil - | 0.5 parts |
| Argus MARK 649A - | 3.0 parts | Rencon Red Dye - | 0.5 parts |
| | | Stabilizers - | (See Table IV) |

Table IV

| Resin & Additive | % Reflectance | Redness |
|---|---|---|
| White Control | 93.4 | |
| Red Stock + PHR MARK KCB | 77.4 | 22.8 |
| Red Stock + 3 PHR ADVASTAB 846-43 | 76.8 | 23.4 |
| Red Stock + 2 PHR ADVASTAB 846-43 + 2 PHR Zeolite 4A | 87.2 | 8.1 |
| Red Stock + 1 PHR ADVASTAB 846-43 + 3 PHR Zeolite 4A | 91.2 | 2.1 |

These values illustrate the increased plate-out resitance of the resins containing zeolite sieves in the formulation.

EXAMPLE IV

This example illustrates the increased weathering stability of clear flexible polyvinyl chloride films stabilized by the stabilizer systems of this invention.

Polyvinyl chloride resin test specimens were formed from the following formulation:

| Geon 130 EP | 100 parts by weight |
|---|---|
| Dioctylphthalate | 50 parts by weight |
| Advastab T 17 M | 3 parts by weight |
| Unactivated Zeolite A | (as shown in Table V) |

The test specimens from these resin formulations have the dimensions of 2 × 2 × 0.3 inches. The specimens are tested in regard to their stability to "Weathering" in an Atlas Weather-ometer. The weathering cycle consists of 102 minutes of light only followed by 18 minutes of light and water spray. This cycle is repeated for 744 hours. The results are shown in Table V. The reflectance of each specimen prior to weathering is about 93 percent.

Table V

| Unactivated Zeolite Additive | % Reflectance |
|---|---|
| Blank (no Zeolite Additive) | 50.5 |
| 0.1 parts Zeolite 3A | 72.8 |
| 1 part Zeolite 3A | 81.3 |
| 2 parts Zeolite 3A | 78.4 |
| 5 parts Zeolite 3A | 73.4 |

EXAMPLE V

This example illustrates the increased weather stability of white opaque polyvinyl chloride film containing the stabilizer system of this invention.

Polyvinyl chloride resin test specimens were formed from the following formulation.

| Geon 103 EP | 100 parts |
|---|---|
| Dioctylphthalate | 50 parts |
| TITANIA | 5 parts |
| Unactivated Zeolite 4A | (as shown in Table VI) |
| MARK 649A | (as shown in Table VI) |

*All parts by weight

The test specimens formed from these resin formulations have the dimensions 2 × 2 × 0.3 inches. The specimens are tested in regard to their stability to "Weathering" in an Atlas Weather-ometer. The weathering cycle consists of 102 minutes of light only followed by 18 minutes of light and water spray. This cycle is repeated for 744 hours. The results are shown in Table VI. The reflectance of each specimen prior to weathering is about 93 percent.

Table VI

| MARK 649A | Unactivated Zeolite 4A | % Reflectance | Yellowness |
|---|---|---|---|
| 1 part | 4 parts | 91 | 7.9 |
| 1 part | 3 parts | 89 | 9.1 |
| 2 parts | 2 parts | 87 | 13.0 |
| 2 parts | 1 part | 81 | 16.5 |
| 3 parts |  | 84 | 19.5 |

(All parts by weight)

The test specimens having a combination stabilizer system prove to be of a higher stability than those not containing the unactivated zeolite component.

What is claimed is:

1. A polyvinyl chloride stabilizing composition consisting essentially of an unactivated crystalline zeolite which contains about 18 to 25 percent by weight water and is selected from the group consisting of zeolite 3A, zeolite 4A, zeolie 5A, chabazite, erionite, clinoptilolite, stilbite and heulandite, in admixture with at least a second polyvinyl chloride stabilizing component.

2. A polyvinyl chloride stabilizing composition as in claim 1 wherein said unactivated crystalline zeolite is selected from the group consisting of zeolite 3A and zeolite 4A.

3. A polyvinyl chloride stabilizing composition as in claim 1 consisting essentially of a crystalline zeolite selected from the group consisting of zeolite 3A and zeolite 4A, in admixture with a second polyvinyl chloride stabilizing component which contains a cation selected from the group consisting of lead, tin, cadmium, zinc, lithium, sodium, calcium, magnesium, strontium, barium and mixtures thereof.

4. A polyvinyl chloride stabilizing composition as in claim 3 wherein the cation containing component is selected from the group consisting of organolead compounds, organotin compounds, organocadmium compounds, organobarium compounds, organostrontium compounds, organozinc compounds, organobarium compounds, organocalcium compounds, organolithium compounds, organosodium compounds and mixtures thereof.

5. A polyvinyl chloride stabilizing composition as in claim 4 wherein said cation containing component contains organatin compounds.

6. A polyvinyl chloride stabilizing composition as in claim 4 wherein said cation containing component contains organocadium compounds.

7. A polyvinyl chloride stabilizing composition as in claim 4 wherein said cation containing compound contains organobarium compounds.

8. A polyvinyl chloride stabilizing composition as in claim 1 wherein said second polyvinyl chloride component is selected from the group consisting of pentraerythritol, glycerol, ethylene glycol, orthoesters, glycidyl ethers and mixtures thereof.

9. A polyvinyl chloride stabilizing composition as in claim 8 wherein said second polyvinyl chloride stabilizing component is an orthoester.

10. A stabilized polyvinyl chloride resin composition comprising polyvinyl resin having dispersed therein a stabilizing composition consisting essentially of an unactivated crystalline zeolite which contains about 18 to 25 percent by weight water and is selected from the group consisting of zeolite 3A, zeolite 4A, zeolite 5A, chabazite, erionite, clinoptilolite, stilbite and heulandite, and at least a second polyvinyl chloride stabilizing component.

11. A stabilized polyvinyl chloride resin composition as in claim 10 wherein said activated crystalline zeolite is selected from the group consisting of zeolite 3A and zeolite 4A.

12. A stabilized polyvinyl chloride resin composition as in claim 10 comprising polyvinyl chloride resin having dispersed therein a stabilizing composition consisting essentially of a cyrstalline zeolite selected from the group consisting of zeolite 3A and zeolite 4A, and a second polyvinyl chloride stabilizing component which contains a cation selected from the group consisting of lead, tin, cadmium, zinc, lithium, sodium, calcium, magnesium, strontium, barium and mixtures thereof.

13. A stabilized polyvinyl chloride resin composition as in claim 12 wherein the cation containing component is selected from the group consisting of organolead compounds, organotin compounds, organocadmium compounds, organobarium compounds, organostrontium compounds, organozinc compounds, organobarium compounds, organocalcium compounds, organolithium compounds, organosodium compounds and mixtures thereof.

14. A stabilized polyvinyl chloride resin composition as in claim 13 wherein said cation containing component contains organotin compounds.

15. A stabilized polyvinyl chloride resin composition as in claim 13 wherein said cation containing component contains organocadmium compounds.

16. A stabilized polyvinyl chloride resin composition as in claim 13 wherein said cation containing component contains organobarium compounds.

17. A stabilized polyvinyl chloride resin composition as in claim 10 wherein said second polyvinyl chloride stabilizing component is selected from the group consisting of pentraerythritol, glycerol, ethylene glycol, orthoesters, glycidyl ethers and mixtures thereof.

18. A stabilized polyvinyl chloride resin composition as in claim 17 wherein said second polyvinyl chloride stabilizing component is an orthoester.

19. A stabilized polyvinyl chloride resin composition as in claim 17 wherein said second stabilizing component is selected from the group consisting of arylphosphites, alkylphosphites, alkarylphosphites, alkarylphosphites and mixtures thereof.

20. A method of stabilizing polyvinyl chloride resins comprising compounding into said resins an unactivated crystalline zeolite which contains about 18 to 25 percent by weight water and is selected from the group consisting of zeolite 3A, zeolite 4A and zeolite 5A, chabazite, erionite, clinoptilolite, stilbite and heulandite, and at least a second polyvinyl chloride stabilizing component.

21. A method of stabilizing polyvinyl chloride resins as in claim 20 wherein said unactivated crystalline zeolite is selected from the group consisting of unactivated zeolite 3A and unactivated zeolite 4A.

22. A method of stabilizing polyvinyl chloride resins as in claim 21 comprising compounding into said resins a second stabilizing component which contains a cation selected from the group consisting of lead, tin, cadmium, lithium, sodium, magnesium, strontium, barium, calcium and mixtures thereof.

23. A method of stabilizing polyvinyl chloride resins as in claim 22 wherein the cation containing component is selected from the group consisting of organolead compounds, organotin compounds, organocadmium compounds, organobarium compounds, organostrontium compounds, organozinc compounds, organobarium compounds, organocalcium compounds, organolithium compounds, organosodium compounds and mixtures thereof.

24. A method of stabilizing polyvinyl chloride resins as in claim 23 wherein said cation containing component contains organotin compounds.

25. A method of stabilizing polyvinyl chloride resins as in claim 23 wherein said cation containing component contains organocadmium compounds.

26. A method of stabilizing polyvinyl chloride resins as in claim 23 wherein said cation containing component contains organobarium compounds.

27. A method of stabilizing polyvinyl chloride resins as in claim 20 wherein said second polyvinyl chloride stabilizing component is selected from the group consisting of pentraerythritol, glycerol, ethylene glycol, orthoesters, glycidyl ethers and mixtures thereof.

28. A method of stabilizing polyvinyl chloride resins as in claim 27 wherein said second polyvinyl chloride stabilizing component is an orthoester.

29. A method of stabilizing polyvinyl chloride resins as in claim 27 wherein said second polyvinyl chloride stabilizing component is selected from the group consisting of arylphosphites alkylphosphites, alkarylphosphites, and mixtures thereof.

30. A molded polyvinyl chloride plastic article containing a first stabilizing component selected from the group consisting of unactivated Zeolite 3A, unactivated zeolite 4A, and unactivated 5A and at least a second polyvinyl chloride stabilizing component.

31. A polyvinyl chloride stabilizing composition as in claim 1 wherein said second polyvinyl chloride stabilizing component is selected from the group consisting of arylphosphites, alkylphosphites and alkarylphosphites.

32. A stabilized polyvinyl chloride resin composition as in claim 10 wherein said second polyvinyl chloride stabilizing component is selected from the group consisting of arylphosphites, alkylposphites and alkarylphosphites.

33. A method of stabilizing polyvinyl chloride resins as in claim 20 wherein said second polyvinyl chloride stabilizing component is selected from the group consisting of arylphosphites, alkylphosphites and alkarylphosphites.

* * * * *